United States Patent [19]

Yamamoto et al.

[11] Patent Number: 4,980,781
[45] Date of Patent: Dec. 25, 1990

[54] METHOD OF AND APPARATUS FOR SETTING ORIGINAL IN IMAGE

[75] Inventors: Masahiro Yamamoto; Makoto Hirosawa, both of Kyoto, Japan

[73] Assignee: Dainippon Screen Mfg. Co., Ltd., Japan

[21] Appl. No.: 235,014

[22] Filed: Aug. 22, 1988

[30] Foreign Application Priority Data

Aug. 20, 1987 [JP] Japan ................................ 62-205113
Sep. 28, 1987 [JP] Japan ................................ 62-240932

[51] Int. Cl.⁵ .................................................. H04N 1/04
[52] U.S. Cl. .................................. 358/474; 358/486; 358/489; 355/75
[58] Field of Search ............... 358/293, 285, 287, 296, 358/102, 237, 486, 487, 488, 489, 490, 493; 439/76, 68, 55; 382/46; 355/72, 75, 122

[56] References Cited

U.S. PATENT DOCUMENTS

| | | | |
|---|---|---|---|
| 3,894,178 | 7/1975 | Pugsley | 358/80 |
| 4,150,873 | 4/1979 | Dali | 358/285 |
| 4,485,411 | 11/1984 | Yamamoto | 358/296 |
| 4,503,468 | 3/1985 | Serinken | 358/256 |
| 4,573,753 | 3/1986 | Vogl | 339/17 LM |
| 4,607,293 | 8/1986 | Okada | 358/328 |
| 4,673,989 | 6/1987 | Yamada | 358/287 |
| 4,682,242 | 7/1987 | Sugita | 358/285 |
| 4,689,693 | 8/1987 | Watanabe | 358/285 |
| 4,700,237 | 10/1987 | Yoshioka | 358/287 |
| 4,705,390 | 11/1987 | Kasahara et al. | 355/52 |
| 4,771,336 | 9/1988 | Ohtorii | 358/285 |
| 4,809,064 | 2/1989 | Amos | 358/102 |
| 4,814,625 | 3/1989 | Yabu | 355/233 |

FOREIGN PATENT DOCUMENTS

| | | | |
|---|---|---|---|
| 0206307 | 12/1986 | European Pat. Off. | |
| 2412094 | 8/1979 | France | 353/120 |
| 1088527 | 4/1985 | U.S.S.R. | 358/79 |

Primary Examiner—Edward L. Coles, Sr.
Assistant Examiner—Jerome Grant
Attorney, Agent, or Firm—Ostrolenk, Faber, Gerb & Soffen

[57] ABSTRACT

An original (1) to be reproduced is held in holder (11) and then the holder (11) is loaded into a projector (10). An image of the original (1) is projected on a layout sheet (18) which is placed on a digitizer (17). Data representative of the position of a desired region of the original (1) is then obtained. The holder (11) is then set in an image scanner (19) and photoelectric scanning is performed in accordance with the data.

23 Claims, 14 Drawing Sheets

PROJECTION WITH MAGNIFICATION FACTOR "M"

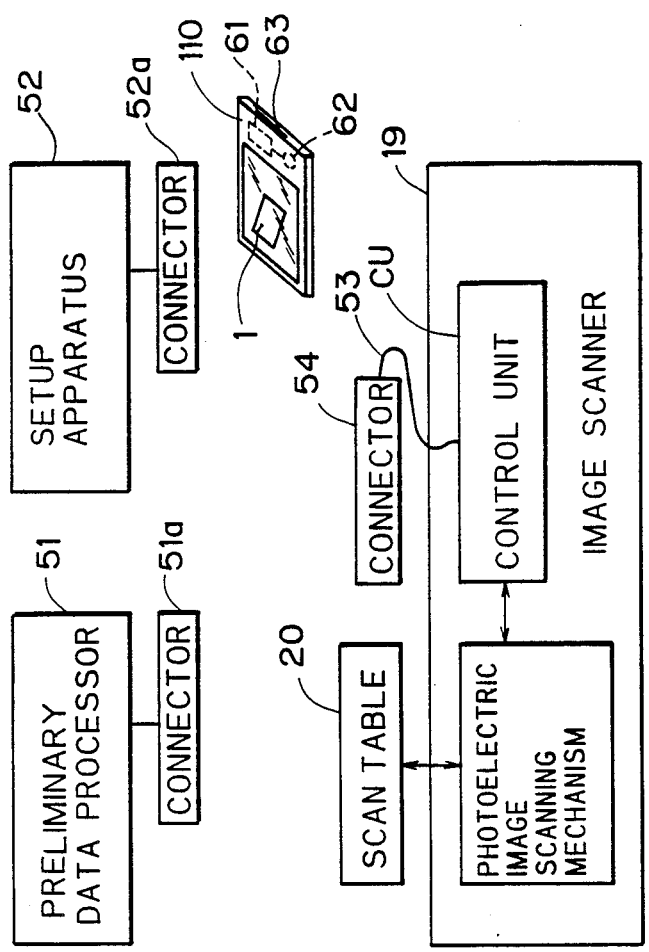

METHOD OF AND APPARATUS FOR SETTING ORIGINAL IN IMAGE

BACKGROUND OF THE INVENTION

1. Field of the Invention

The present invention relates to a method of and an apparatus for setting an original in an image scanner of a process scanner system and the like.

2. Description of the Prior Art

In a process scanner system, each scanning line of an image of an original is read with an image scanner to obtain image data. The image data is then processed and delivered to a control unit for directing an exposure beam to photosensitive material. Such image scanning should be carried out under two important conditions: one, the original should be properly set in the image scanner, and two various parameters or "scan data" required for scanning and image data processing should be optimally set to obtain a desired reproduced image.

With respect to condition one, a conventional technique involves clipping a desired area from the original and pasting the clipped area on a layout sheet or a transparent sheet (such as a transparent resin film.) The sheet is then set on an image scanner. In another conventional technique, the entire original is pasted on a layout sheet so that the desired area of the original is located in a trimming region previously indicated on the layout sheet. The layout sheet is then set in the image scanner and each scanning line of the image of the desired area is read.

In the conventional techniques, the layout sheet or the transparent sheet must be thrown away after use. This is uneconomical. Another disadvantage is that careful handling of the original is required since the original is used not only in the image reader but also during a layout process on a digitizer and it is sometimes damaged due to careless handling.

In order to meet requirement two, a conventional technique involves mutually setting optimum values of parameters (such as the optical densities of highlight and shadow points) in the image scanner. Sometimes, the parameter values with respect to a particular original are mistaken for those of To prevent such a mistake, the parameter values may be transmitted from a setup apparatus to the image scanner with on-line transmission. However, such a system is complicated and expensive.

SUMMARY OF THE INVENTION

The present invention is directed to a method of placing an original in an image scanner to read an image of a desired area of the original. The method includes the steps of; (a) placing an original in a holder which holds the original; (b) observing the original while the original is held by the holder and specifying in a rectangular region which includes a desired area of the original in accordance with a predetermined scanning plan; (c) obtaining reference data which is indicative of the location and inclination of the rectangular region with respect to the holder; and (d) placing the holder in an image scanner while the original is held by the holder and adjusting the holder with respect to the image scanner in accordance with the data so that a side of the rectangular region is parallel to a scanning direction of the image scanner. The present invention is also directed to a system for performing such a method.

The present invention is also directed to a method of recording data in an image scanner. The method includes the steps of: (a) placing an original in a holder which holds the original; (b) storing data which includes information required for scanning the original to read an image of the original; (c) placing the holder in an image scanner while the original is held by the holder; and (d) after step (b), reading the data by means of the image scanner to record the data in the image scanner. The present invention is also directed to a system for performing such a method.

The present invention is also directed to a system for scanning an image of an original to read the image according to scan data indicating a scanning condition for reading the image. The system includes: (a) a holder for holding an original (the holder has a memory); (b) data generating means for generating data in accordance with an image of the original and a scanning plan prepared by an operator (the data generating means includes means for recording the data in the memory of the holder); and (c) an image scanner for scanning the image of the original. The image scanner includes: (1) a table for accepting the holder; (2) an image scanner for scanning the image; (3) reading means for reading data stored in the memory; and (4) control means for controlling the image scanner according to the generated data.

The present invention is also directed to a holder for holding an original in a scanner. The holder includes: frame members which are connected to each other at their edges by a hinge (the frame members define windows); transparent plates located in the windows; a reference mark; and means for projecting images of an original and the reference mark on a plane of an image scanner.

The present invention is also directed to a holder for holding an original in an image scanner. The holder includes: means for holding an original and a memory attached to the holding means for storing data. The memory is accessible from the exterior of the holding means.

The present invention is also directed to a table for accepting an original thereon to read an image of the original by means of an image scanner. The table includes a hollow member having a window. The window has a shape corresponding to a shape of a holder for holding the original. The table also includes a rotary table which is mounted in the window. The rotary table is rotatable with the original around a center thereof.

The present invention is also directed to a method of recording data in a drum-type image scanner. The method includes the steps of: positioning an original on a base sheet and recording data on tape located at an edge of said drum. The data includes information required for scanning an image of the original with a drum-type image scanner. The method also includes the steps of winding the base sheet on a drum with the tape partially or fully surrounding the drum and rotating the drum around an axis while reading the data from the tape to record the data in the drum-type image scanner. The present invention is also directed to a system for performing such a method.

The present invention is also directed to a drum for use in a drum-type image scanner for reading an image of an original. The drum includes a surface around which an original can be wound and a memory located on said surface for storing data.

Accordingly, an object of the present invention is to provide a highly efficient and low cost method of setting an original in an image scanner. which is attained in a high efficiency and at a low cost.

Another object of the present invention is to prevent an original from being damaged through careless handling thereof.

Another object of the present invention is to set scan data in an image scanner without mistaking the scan data for that of another original.

Another object is to provide an original holder suitable for holding an original.

Another object of the present invention is to provide a scan table capable of accepting an original holder and changing the orientation of the original holder.

These and other objects, features, aspects and advantages of the present invention will become more apparent from the following detailed description of the present invention when taken in conjunction with the accompanying drawings.

BRIEF DESCRIPTION OF THE DRAWINGS

FIG. 12 is a block diagram of an image scanner and peripheral apparatuses.

DESCRIPTION OF THE PREFERRED EMBODIMENTS

Figure 1:
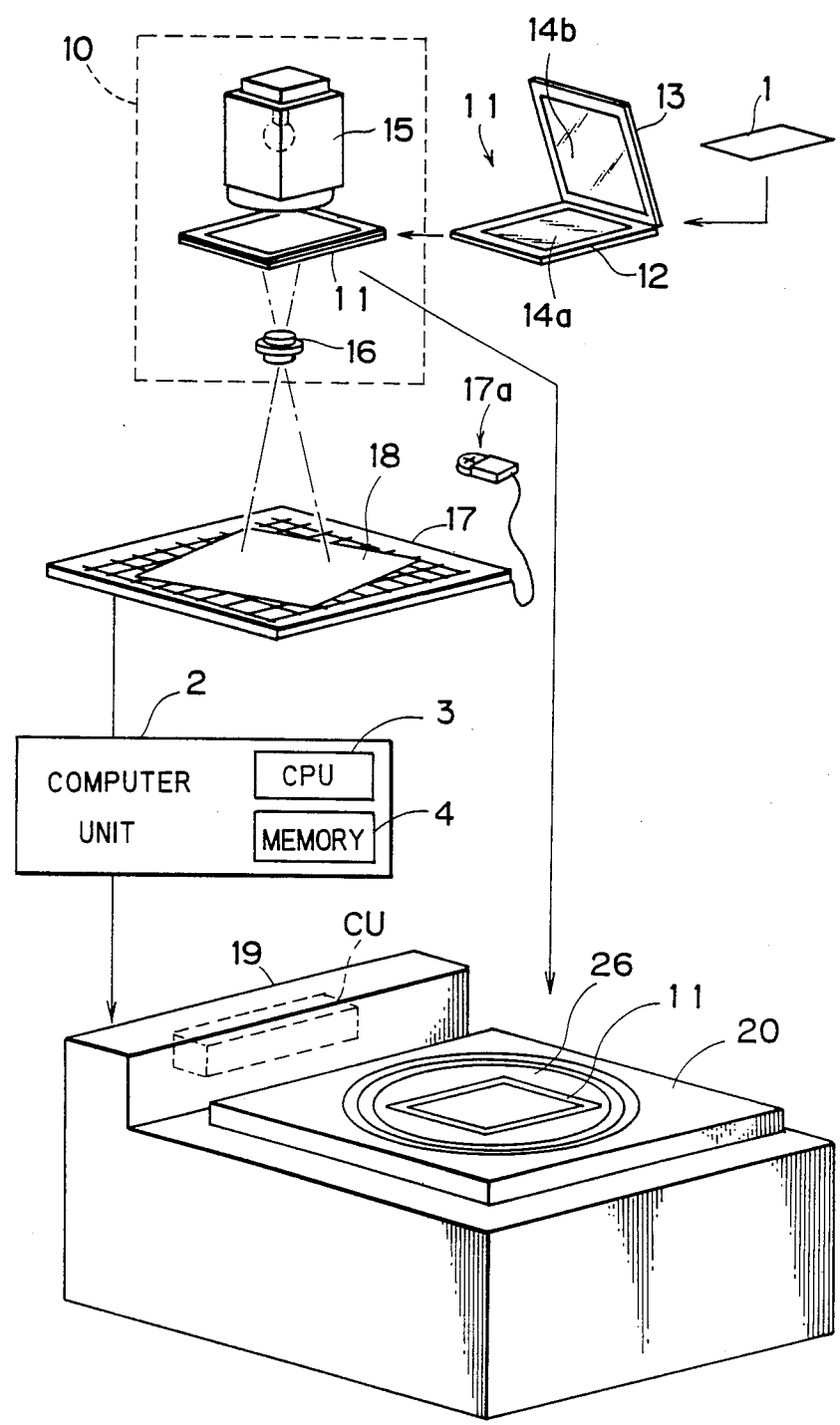
FIG. 1 is a schematic diagram of an image scanner and peripheral devices according to a preferred embodiment of the present invention.
Figure 2:
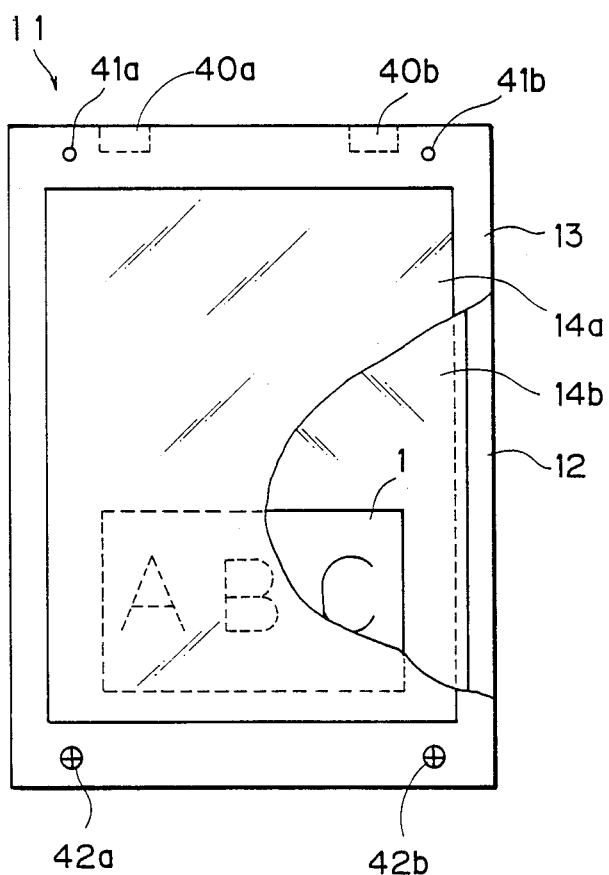
FIG. 2 is a plan view of an original holder.

FIG. 1 is a schematic view of an image scanner 19 of a process scanner system of a flat bed type. A holder 11 for holding an original 1 has a lower frame 12 and an upper frame 13. The frames 12 and 13 are connected to each other through hinges 40a and 40b (see FIG. 2) provided between the respective edges of the frames 12 and 13 so that the frames 12 and 13 can rotate around the hinge axis. In the respective windows, surrounded by the frames 12 and 13, transparent plates 14a and 14b (such as glass plates) are mounted, respectively. The original 1 is placed on the transparent plate 14a in an arbitrary position. The frames 12 and 13 are then closed so that the original 1 is held between the transparent plates 14a and 14b. As shown in FIG. 2, a pair of holes 41a and 41b are formed through the frames 12 and 13. The holes 41a and 41b are used for adjusting the original holder 11 to a rotary table 26 shown in FIG. 1, as will be described later. Small windows 42a and 42b are formed in the adjacent corners of the upper frame 12 and small transparent disks are mounted in the windows 42a and 42b. A reference mark (such as a cross mark) is provided in each of the transparent disks 42a and 42b. Small windows aligned with the windows 42a and 42b are formed in the lower frame 12, although they are not illustrated in FIG. 2.

The original holder 11 (while holding the original 1) is carried to a projector 10 (FIG. 1). The projector 10 has a light source head 15 and a When the original holder 11 is loaded between the light source head 15 and the lens 16 and the light source in the light source head 18 is turned on, the image of the original 1 is projected on a layout sheet 18 placed on a digitizer 17. The reference marks in the transparent discs 42a and 42b are also projected on the layout sheet 18. In order to obtain a clear image on the layout sheet 18, the light source is constructed so as to emit enough light to penetrate through the original 1. If the original 1 is a transparent film original, the light may be relatively weak.

The layout sheet 18 is not fixed on the digitizer 17 but can be moved thereon. A closed line or curve expressing a trimming frame 43 (FIG. 3) has been previously drawn on the layout sheet 18. The trimming frame 43 indicates an image area to be extracted from the original 1, which has been previously determined according to a layout plan of a reproduced image.

The position of the layout sheet 18 and the magnification of the image projection is adjusted so that the image of the desired area on the original 1 is magnified or reduced to fit the region indicated by the trimming frame 43 on the layout sheet 18. The magnification factor can be changed by adjusting the distance between the original holder 11 and the lens 16 as well as the distance between the lens 16 and the digitizer 17. Preferably, the projector 15 is an auto-focus projector in which the original holder 11 and the lens 16 move together to maintain an image forming position regardless of the value of the magnification factor and the current magnification factor is automatically outputted as a magnification factor data.

Figure 3:
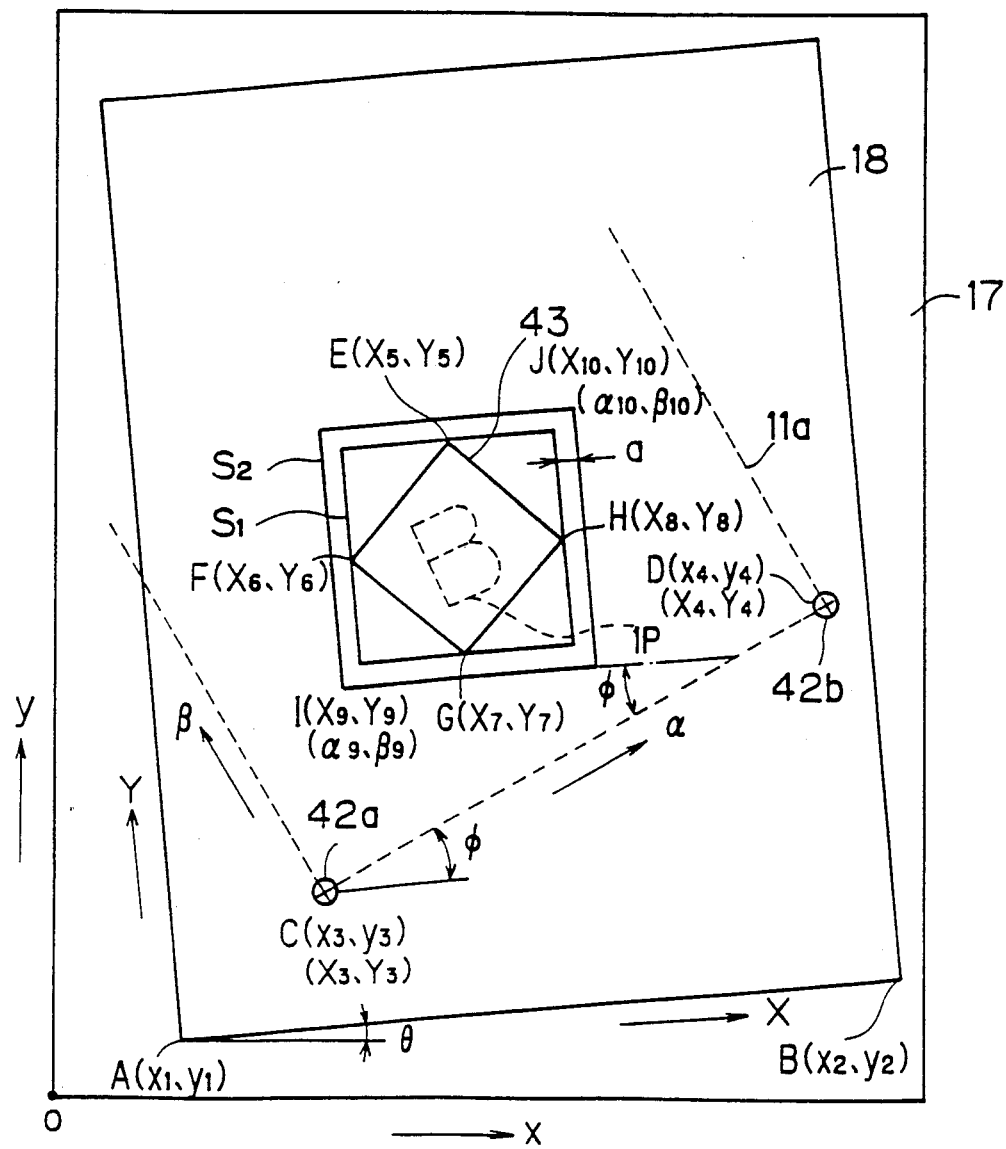
FIG. 3 is a diagram of various coordinates on a digitizer.

FIG. 3 illustrates shows the state where the image of the original 1 is projected on the layout sheet 18, and the image 1P in the desired area on the original 1 is fitted in the trimming frame 43. The image of the original 1 is illustrated as the characters "A", "B" and "C" in FIG. 1 through FIG. 3 for convenience of illustration. However, in practice, the image is usually a photographic image. The process described above is indicated in FIG. 4A as the process steps 301–303.

For the following description, three two-dimensional Cartesian coordinate systems are defined as follows:

(x,y): a coordinate system defined on the digitizer 17, (X,Y): a coordinate system defined on the layout sheet 18, ($\alpha,\beta$): a coordinate system defined on an imaginary profile 11a of the original holder 11 on the layout sheet 18.

These coordinate systems are hereinafter referred as "x-y system", "X-Y system", and "$\alpha$-$\beta$ system", respectively. The digitizer 17 (and a digitizer tablet 17a shown in FIG. 1) detect the x-y coordinates of an apex A (FIG.

Figure 4A:
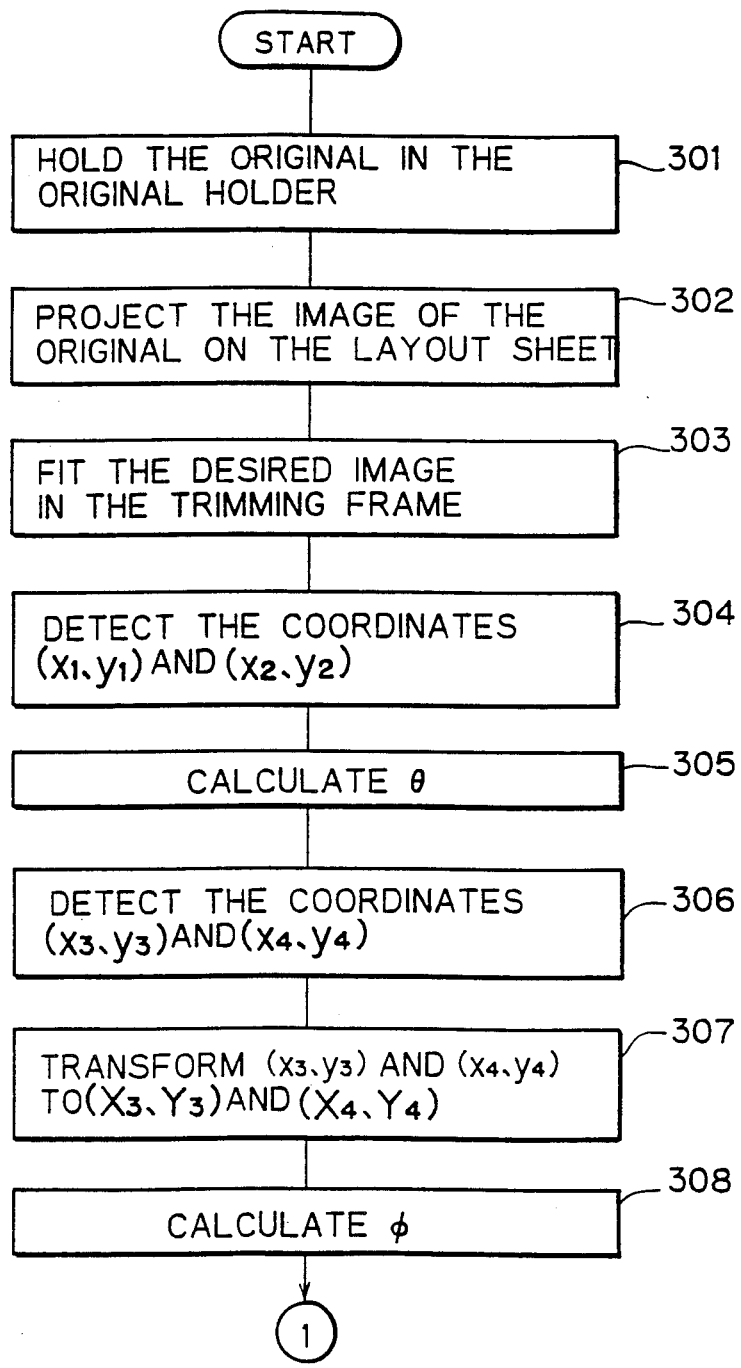
FIG. 4 is a flow chart which illustrates a process of obtaining a coordinate data and angle data.

3) of the layout sheet 18 as well as the x-y coordinates of an arbitrarily selected point B along the lower edge of the layout sheet 18. When the detected coordinates of the points A and B are expressed as $(x_1, y_1)$ and $(x_2, y_2)$, respectively, the incline angle $\theta$ of the layout sheet 18 with respect to the digitizer 17 is obtained through the following expressions (1a)–(1c). (This is also shown in FIG. 4A, as process steps 304 and 305.)

$$\theta = \tan^{-1}\{(y_2-y_1)/(x_2-x_1)\}, \text{ for } x_2 \neq x_1, \quad (1a)$$

$$\theta = \pi/2, \text{ for } x_2 = x_1 \text{ and } y_2 > y_1, \quad (1b)$$

$$\theta = \pi/2, \text{ for } x_2 = x_1 \text{ and } y_2 < y_1. \quad (1c)$$

In order to calculate the respective values of the angle $\theta$ and other parameters described later, the process scanner illustrated in FIG. 1 includes a computer unit 2 which has a CPU 3 and a memory 4. The computer unit 2 is electrically connected to the digitizer 17.

Using the value of the angle $\theta$ obtained through the expressions (1a)–(1c), the following coordinate transformation formulas (2a) and (2b) for transforming coordinates in the x-y system to those in the X-Y system are applied, and data derived system to those in X-Y system is obtained, and data expressing the formulas (2a) and (2b) is stored in the memory 4.

$$X = (x-x_1)\cos\theta + (y-y_1)\sin\theta \quad (2a)$$

$$Y = (x-x_1)\sin\theta + (y-y_1)\cos\theta \quad (2b)$$

Then, the coordinates of the projected reference marks C and D in the projected windows 42a and 42b are detected in the x-y system, as $(x_3, y_3)$ and $(x_4, y_4)$, respectively. These coordinates are transformed to the X-Y system through the formulas (2a) and (2b), to obtain $(X_3, Y_3)$ and $(X_4, Y_4)$. The incline angle $\phi$ of the imaginary profile 11a with respect to the layout sheet 18 is obtained as follows (the process steps 306–308):

$$\phi = \tan^{-1}\{(Y_4-Y_3)/(X_4-X_3)\}, \text{ for } X_3 \neq X_4, \quad (3a)$$

$$\phi = \pi/2, \text{ for } X_3 = X_4 \text{ and } Y_4 > Y_3, \quad (3b)$$

$$\phi = \pi/2, \text{ for } X_3 = X_4 \text{ and } Y_4 < Y_3. \quad (3c)$$

In the next process step, the positions of the trimming frame 43 drain on the layout sheet 18 are detected. When the trimming frame 43 has the shape of a rectangle FEGH, for example, the respective positions of the apexes F, E, G and H are detected in the x-y system with the digitizer 17 and the tablet 17a, and then transformed to the X-Y system, to obtain $E(X_5, Y_5)$, $F(X_6, Y_6)$, $G(X_7, Y_7)$ and $H(X_8, Y_8)$.

When the original 1 is subjected to the image reading process with the image scanner 19 after the setting process is completed, the image in the trimming frame 43 should be extracted from the image of the original 1. The image scanner 19 is constructed so as to read each scanning line of the image, and the layout of a reproduced image on a record medium such as a photosensitive film is indicated by the image layout on the layout sheet 18. Therefore, in the image reading process which will be described later, the original 1 is set in the image scanner 19 under the condition where the respective directions of X and Y are parallel with the main scanning direction and the subscanning direction, respectively. Accordingly, a scan region on the original 1 to be scanned with the image scanner 19 should have a rectangular shape having lateral sides which are parallel to the X-direction and vertical sides which are parallel to the Y-direction.

With respect to the image 1P shown in FIG. 3, the scan region thereof may be specified as a rectangular region $S_1$ circumscribing the trimming frame 43 and having lateral sides which are parallel to the X-direction and vertical sides which are parallel to the Y-direction. Alternatively, another rectangular region $S_2$ surrounding the rectangular region $S_1$ with a margin a may be employed as the scanning region. The value of the margin a may be previously determined and stored in the memory 4 as a fixed value, or it may be arbitrarily determined and inputted by an operator for each original. In the preferred embodiment, the latter rectangular region $S_2$ is employed, rather than the former $S_1$.

The respective coordinates $(X_9, Y_9)$ and $(X_{10}, Y_{10})$ of the left-bottom apex I and the right-top apex J in the rectangle $S_2$ are obtained through the expressions (4a)–(4d).

$$X_9 = min(X_5, X_6, X_7, X_8) - a \quad (4a)$$

$$Y_9 = min(Y_5, Y_6, Y_7, Y_8) - a \quad (4b)$$

$$X_{10} = min(X_5, X_6, X_7, X_8) + a \quad (4c)$$

$$Y_{10} = min(Y_5, Y_6, Y_7, Y_8) + a \quad (4d)$$

where the symbols "min" and "max" indicate the minimum and maximum values in the parenthesis, respectively.

The coordinates $(X_9, Y_9)$ and $(X_{10}, Y_{10})$ in the X-Y system are transformed to the coordinates $(\alpha_9, \beta_9)$ and $(\alpha_{10}, \beta_{10})$, respectively, through the coordinate transformation formulas (5a) and (5b).

$$\alpha = (X-X_3)\cos\phi + (Y-Y_3)\sin\phi \quad (5a)$$

$$\beta = -(X-X_3)\sin\phi + (Y-Y_3)\cos\phi \quad (5b)$$

Figure 4B:
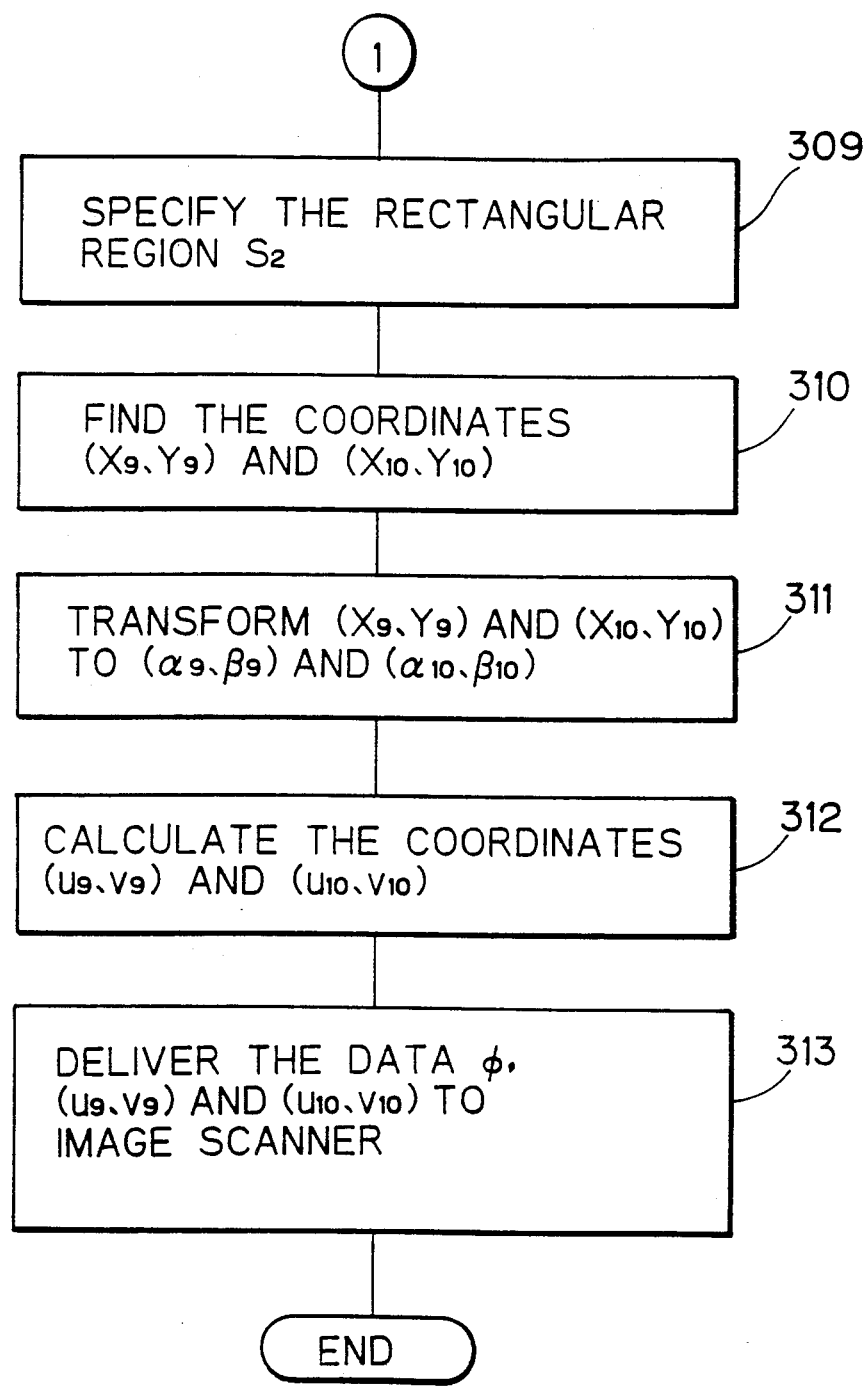

These steps are shown in FIG. 4B as process steps 309–311. Note that the angle $\phi$ is the angle at which the rectangular region $S_2$ is inclined from a reference line interconnecting the reference marks in the projected windows 42a and 42b.

Such a rectangle circumscribing a trimming frame can be obtained even when the shape of the trimming frame is other than a a rectangle (e.g., a circle, an ellipse, and a polygon other than a rectangle).

Figure 5A:
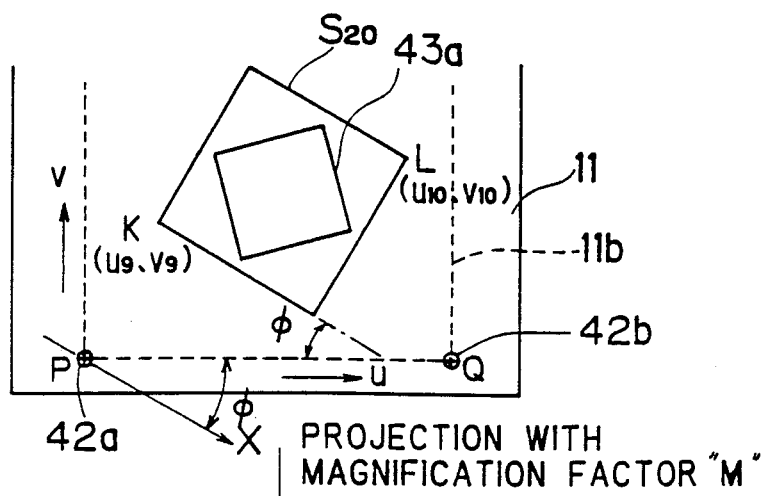
FIG. 5A and FIG. 5B are schematic diagrams illustrating a relationship between the original holder and an image projected on a layout sheet.

FIG. 5A is a partial plan view of the original holder 11 illustrating an imaginary profile line 11b corresponding to the imaginary profile line 11a on the layout sheet 18. The imaginary profile line 11b is defined as an imaginary rectangle whose neighbouring two apexes P and Q coincide with the reference marks in the windows 42a and 42b, respectively. Although a trimming frame 43a and a rectangular region $S_{20}$ corresponding to the trimming frame 43 and the rectangular region $S_2$, respectively, are illustrated in FIG. 5A, these are not actual lines on the original holder 11, but rather, only imaginary lines indicated for reference.

Figure 5B:
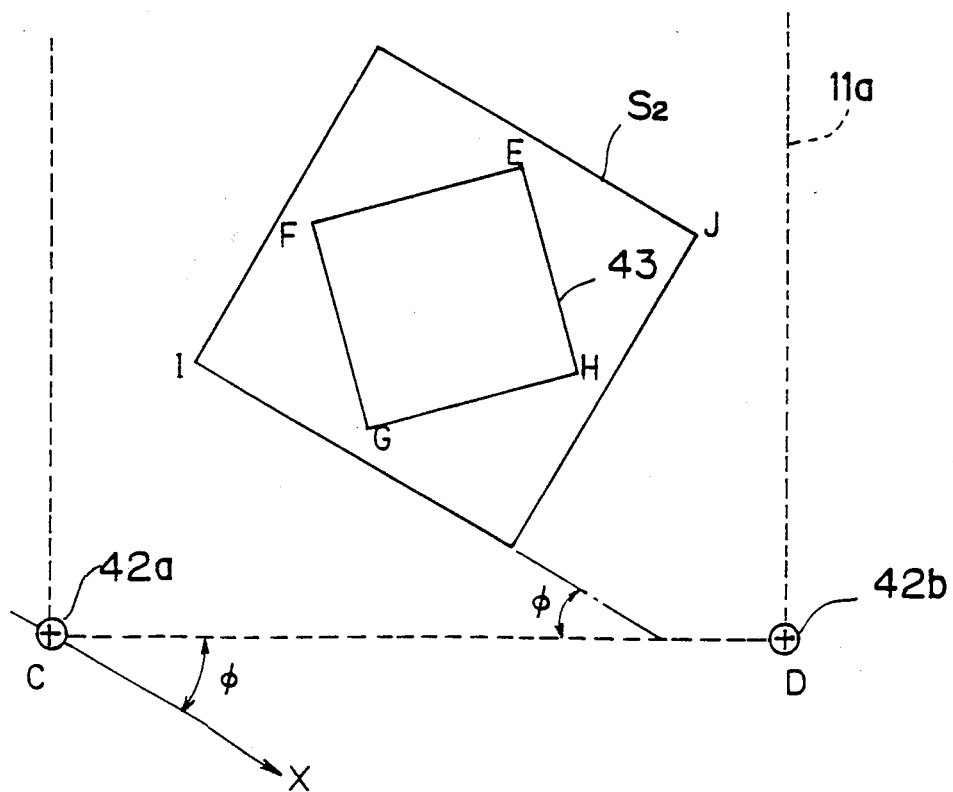

When the magnification factor in the projector 15 has a value M, all of the images in the original holder 11 are magnified by the magnification factor M on the layout sheet 18 FIG. 5B is a partial diagram showing the region on the layout sheet 18 corresponding to that shown in FIG. 6A. The apexes C and D correspond to the apexes P and Q, respectively, and the apexes I and J of the rectangle S correspond to the apexes K and L, respectively. The ratio of the image size of FIG. 5A to that of FIG. 5B has a value equal to the magnification factor M.

When another two dimensional Cartesian coordinate system (u, v) is defined on the original holder the respective coordinates ($u_9$, $v_9$) and ($u_{10}$, $v_{10}$) of the apexes K and L are obtained through the expressions (process step 312 in FIG. 4B):

$$u_9 = \alpha_9/M \tag{6a}$$

$$v_9 = \beta_9/M \tag{6b}$$

$$u_{10} = \alpha_{10}/M \tag{6c}$$

$$v_{10} = \beta_{10}/M \tag{6d}$$

As described later, the rectangular region $S_{20}$ corresponds to the scan region on the original 1.

The data expressing the respective values of the parameters $\phi$, ($u_9$,$v_9$) and ($u_{10}$,$v_{10}$) are stored in the memory 4 as reference data, and delivered to the image scanner 19 (process step 313). Delivery of the reference data may be attained through on-line communication, or off-line communication with a memory such as a floppy disc, magnetic tape or the like. Alternatively, the data may be printed on a data sheet for manual input into the image scanner 19.

In response to the delivery of reference data, a control unit CU (FIG. 1) provided in the image scanner 19 operates to set the respective values of the angle $\phi$ and the coordinates ($u_9$, $v_9$) and ($u_{10}$, $v_{10}$) therein. The data with respect to the magnification factor M delivered from the projector 15 is also set in the control unit CU as reference data. The control unit CU has a microcomputer and operates according to a program previously stored therein.

It should be noted that the rectangular region $S_{20}$ is inclined at an angle $\phi$ with respect to a reference line interconnecting the reference marks in the windows 42a and 42b.

Figure 6:
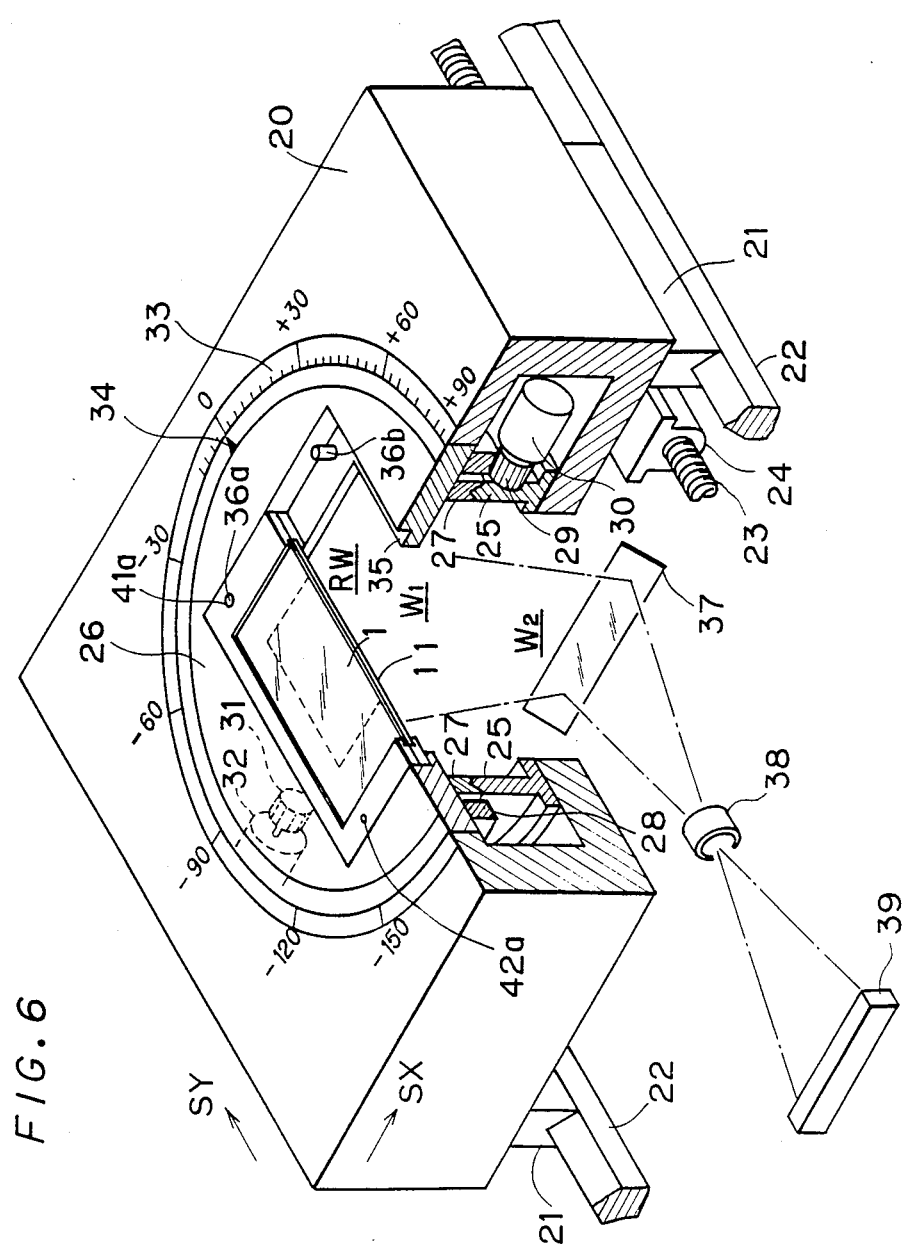
FIG. 6 is a perspective view of a scan table.

FIG. 6 is a perspective view of a scan table 20 provided in the top surface of the image scanner 19. (Part of the table 20 is broken away for convenience of illustration.) The scan table 20 is shaped as a hollow box having circular windows $W_1$ and $W_2$ on the upper and lower surfaces thereof. A pair of sliders 21 is provided on the lower surface of the scan table 20. The scan table 20 is supported on a pair of guide rails 22 which are mounted in the scanner 19.

A screw rod 23, which is parallel to the guide rails 22, is connected to a drive motor (not shown). A nut 24 is fixed on the lower surface of the scan table 20 and the screw rod 23 is inserted therein. The drive motor rotates the screw rod 23 to slide the scan table 20 along the longitudinal direction of the sliders 22.

On the inner edge of the scan table 20, a circular guide member 25 is provided to support a rotary table 26 through a circular slider 27. The slider 27 is fixed to the lower surface of the rotary table 26. The rotary table 26 is a disc having a rectangular window RW into which the original holder 11 can be inserted. The rotary table 26 is inserted into the upper window $W_1$ of the scan table 20. A circular rack 28 is fixed to the lower surface of the rotary table 26. The circular rack 28 is concentric with the circular slider 27. In place of the circular rack 28, three or more rack pieces may be aligned along the circular slider 27 at regular intervals.

In the scan table 20, a motor 30 is provided for rotating a gear 29. The gear 29 is fitted with the circular rack 28 so that the rotary table 26 can be horizontally rotated. The rotary table 26 may rotate within an angle range of ±90° with respect to a reference position, or alternatively, it may rotate within a full angle range, i.e., 360°.

A rotary encoder 32 having a gear 31 is also provided in the scan table 20. The gear 31 is fitted with the circular gear 28. When the rotary table 26 rotates, the rotary encoder 32 generates an electric pulse upon every rotation of the rotary table 26 through a small, constant angle. A rotation angle detector other than the rotary encoder 32 may be employed in place of the rotary encoder 32. Preferably, the rotation angle detector is high accuracy.

Angle indexes 33 are marked around the window $W_1$ on the upper surface of the scan table 20. An indication mark 34 is located at the edge of the rotary table 26. A step member 35 is formed along the inner peripheral edge of the window RW. A pair of pins 36a and 36b extend upwardly on neighboring corners of the step member 35. The pins 36a and 36b are inserted into the holes 41a and 41b (FIG. 2) when the original holder 11 is set into the rectangular window RW. With the combination of the pins 36a and 36b and the holes 41a and 41b, the position of the original holder 11 in the rectangular window RW is precisely restricted. The small windows 42a and 42b shown in FIG. 2 are so positioned in the by the step member 35 when the original holder 11 is set in the rectangular window RW.

The image scanner 19 has a photoelectric scan mechanism consisting of a mirror 37, a lens 38, a linear image sensor 39, etc. The photoelectric scan mechanism is positioned under the scan table 20. A light source (not shown) is provided above or below the scan table 20 to emit a light to the window $W_1$. In an image reading operation which will be described later, a line image in the original 1 is projected on the linear image sensor 39 through the mirror 37 and the lens 38. The linear image sensor 39 is a linear CCD array, for example, and serially converts the line image projected thereon into an electric image signal, to achieve a main scanning of the image of the original 1. The scan table 20 is linearly moved along the direction SY through a rotation of the screw rod 23, to achieve subscanning. Accordingly, the direction SX (which is parallel to the longitudinal direction of the linear image sensor 39) is a main scanning direction, and the direction SY (which is parallel to the screw rod 23) is a subscanning direction. Through the combination of the main scanning and the subscanning, the two dimensional image of the original 1 is photoelectrically read.

Figure 7:
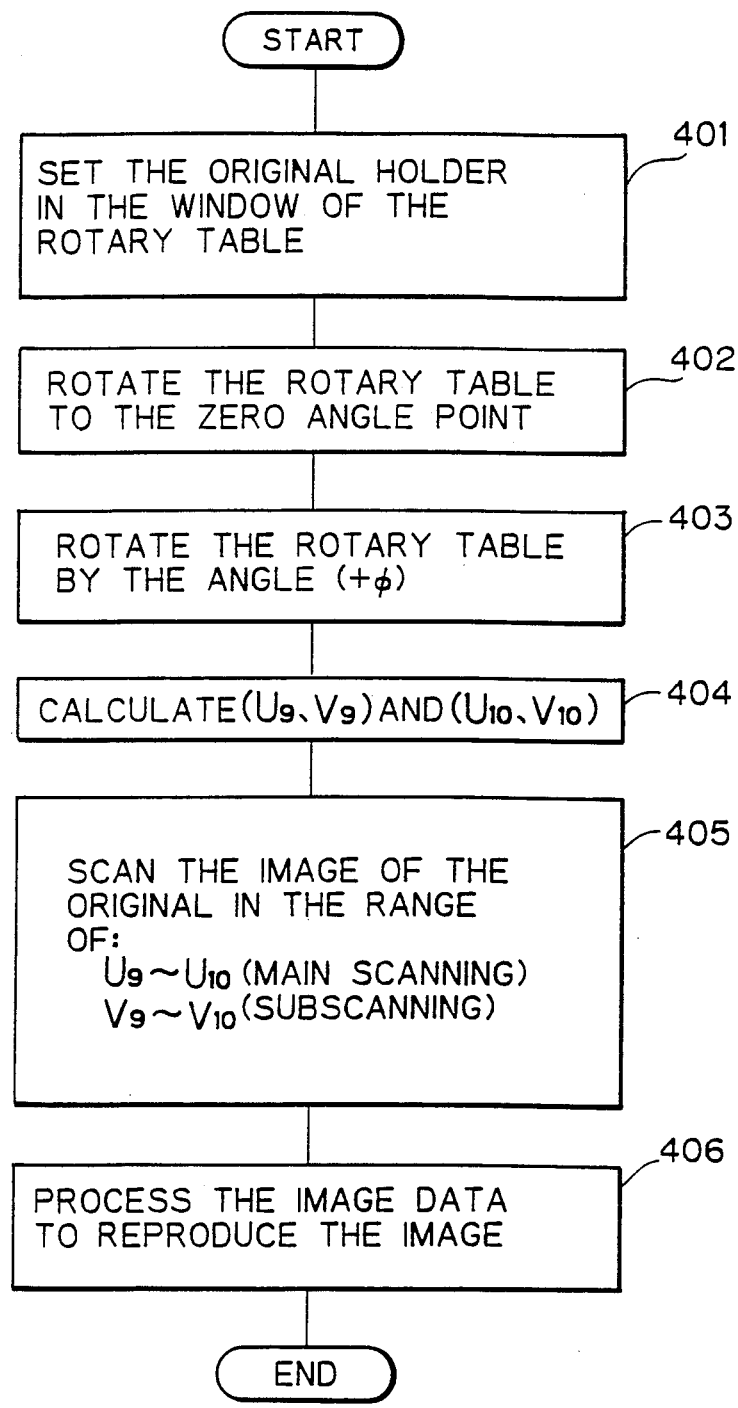
FIG. 7 is a flow chart of a process of setting the original holder in the scan table.

The operation for setting the original holder 11 (holding the original 1) in the image scanner 19 is conducted as follows:

After setting the reference data in the control unit CU, the holder 11 (holding the original 1) is set in the rectangular window RW (process step 401 in FIG. 7) without changing the position of the original 1 in the holder 11. Positional adjustment between the original holder 11 and the rectangular window RW is achieved through the combination of the pins 36a and 36b and the holes 41a and 41b.

Figure 8:
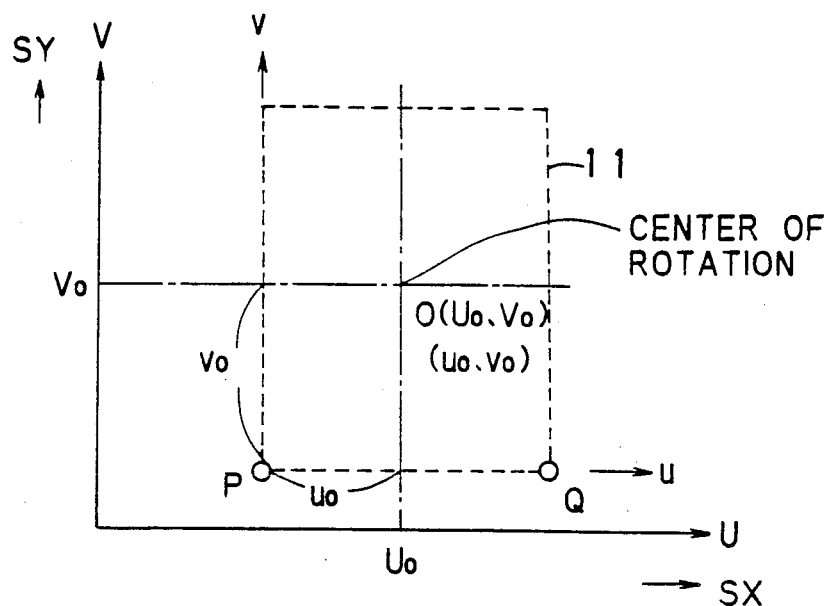
FIG. 8 through FIG. 10 are coordinate diagrams of coordinates on the scan table.

Then, the rotary table 26 is rotated so that the indication mark 34 indicates the zero angle point or the "0"

mark in the indexes 33 (process step 402). A two dimensional coordinate system (U, V) shown in FIG. 8 is defined on the image scanner 19 so that the U-axis and the V-axis are parallel to the main scanning direction SX and the subscanning direction SY, respectively. The rotational center O of the rotary table 26 has coordinates ($U_0$, $V_0$) in the U-V system and coordinates ($u_0$, $v_0$) in the u-v system defined on the original holder 11. The values of these coordinates can be previously determined since they are constant regardless of the position of the original 1 in the original holder 11. These values are previously stored in the memory of the control unit CU.

After adjusting the original holder 11 to the zero angle point, the motor 30 rotates the table 26 through the angle ($+\phi$) (process step 403). The rotation is conducted under the control of the control unit CU. That is, the control unit CU monitors the output signal of the rotary encoder 32 and when the output signal indicates that the rotary table 26 is rotated by the angle ($+\phi$), the motor drive is stopped.

Figure 9:
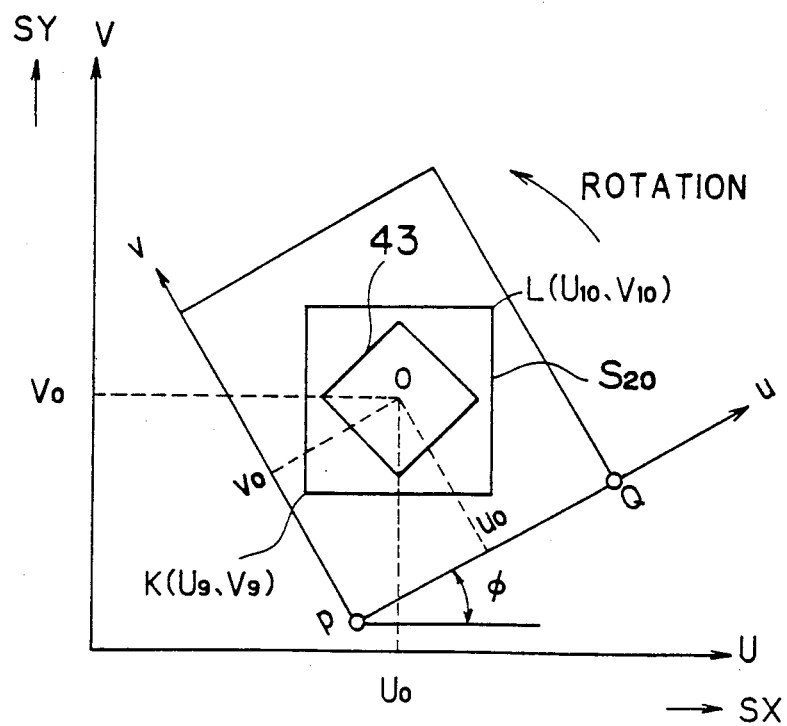

FIG. 9 shows the state which the rotation of the table 11 by ($+\phi$) is completed. Note that the angle $\phi$ is defined as an angle formed by the X-axis (FIG. 5A) and the u-axis and the X-axis corresponds to the bottom edge of the layout sheet 18. Therefore, when the original 1 is rotated by ($+\phi$) the angular relationship between the original 1 and the main scanning direction SX becomes identical to that between the original 1 and the bottom edge of the layout sheet 18.

On the other hand, the rectangular region $S_2$ (FIG. 3) is defined so that its top and bottom sides are parallel to the X-direction. Therefore, the rectangular region $S_{20}$ (FIG. 5A) (which corresponds to the region $S_2$) has top and bottom sides which are parallel to the X-axis. Further, the main scanning direction SX and the U-axis in the image reading process correspond to the X-axis in the layout sheet 18. Therefore, in the state shown in FIG. 9, the top and bottom sides of the rectangular region $S_{20}$ are parallel to the U-axis and the main scanning direction SX, and the right and left sides of the same are parallel to the V axis and the subscanning direction SY.

In the next process step 404, which may be prior to the steps 401-403, respective coordinates ($u_9$, $v_9$) and ($u_{10}$, $v_{10}$) of the points K and L in the u-v system are transformed to coordinates ($U_9$, $V_9$) and ($U_{10}$, $V_{10}$) in the U-V system, respectively, through the coordinate transformation formulas (7a) and (7b).

$$U = (u - u_0)\cos\phi - (v - v_0)\sin\phi + U_0 \quad (7a)$$

$$V = (u - u_0)\sin\phi + (v - v_0)\cos\phi + V_0 \quad (7b)$$

The values of $U_9$ and $U_{10}$ define the main scanning range of the rectangular scan region $S_{20}$, and the values $V_9$ and $V_{10}$ define the subscanning range of the scan region $S_{20}$. The transformations according to the formulas (7a) and (7b) are performed in the control unit CU, and the coordinate values thus obtained are stored in the memory of the control unit CU to complete the original setting process.

After setting the original 1 in the image scanner 19, the photoelectric scan mechanism is enables so that each scanning line of the image in the scan region $S_{20}$ is read (process step 405). The reading range is restricted within the coordinate values $U_9$, $U_{10}$, $V_9$ and $V_{10}$. That is, main scanning is performed only in the range from $U_9$ to $U_{10}$ and subscanning performed only in the range from $V_9$ to $V_{10}$. The image data obtained in the image scanner 19 is processed in processing circuits (not shown) to be delivered to an exposure unit for exposing a photosensitive film (process step 406). As a result, a reproduced image in accordance with the image layout on the layout sheet 18 is obtained on the photosensitive film. The image in the scan region $S_{20}$ is recorded on the film at the desired incline angle $\phi$ from the bottom edge of the film. The preferred embodiment described above may be modified as follows:

Although in the example illustrated in FIG. 9, the center of the scan region $S_{20}$ is coincident with the center of rotation O and the center of the original holder 11, they may be different from each other and the above described process will still be applicable. When it is desired that the center of the scan region $S_{20}$ be located at the point ($U_0$ $V_0$) (the rotation center), the scan table 20 is constructed so as to be translationally movable on the image scanner 19 in the U-direction and/or V-direction with a translational drive mechanism such as a linear actuator. The amount of translational movement or displacement required to bring the center of the scan region $S_{20}$ to the point ($U_0$, $V_0$) is estimated as:

$$U_0 - (U_9 + U_{10})/2, \text{ for the U-direction} \quad (8a)$$

$$V_0 - (V_9 + V_{10})/2, \text{ for the V-direction} \quad (8b)$$

Figure 10:
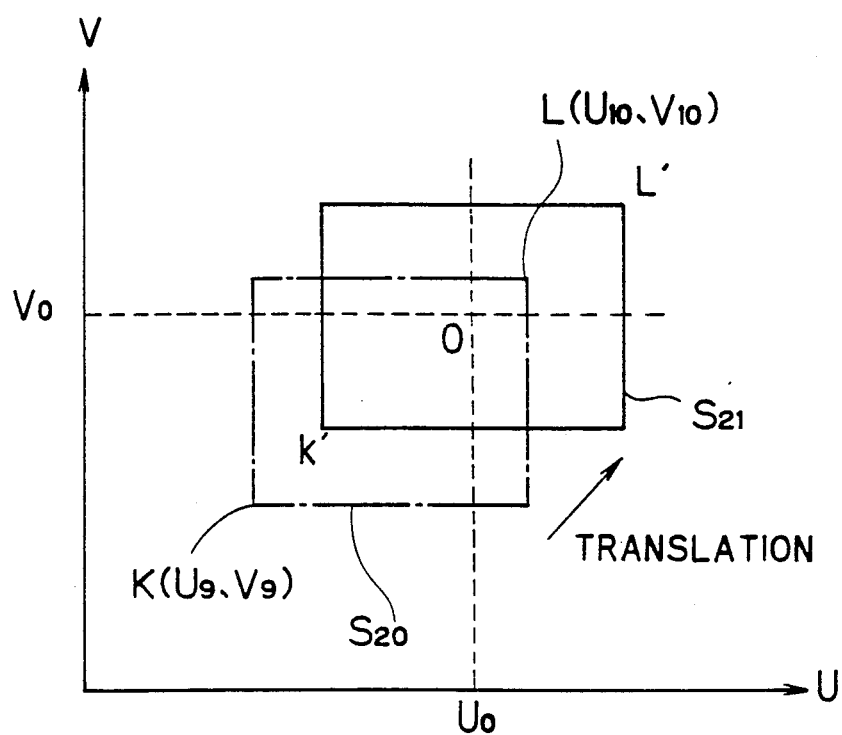

Through the movement, the scan region $S_{20}$ shown in FIG. 10 is displaced to the region $S_{20}$ whose center is coincident with the point ($U_0$, $V_0$) corresponding to the registered rotation center O, and apexes K and L are moved to the points K' and L', respectively, so that the center of the scan region $S_{20}$ is moved to the registered rotation center. Note that the registered rotation center ($U_0$, $V_0$) is not the real rotation center after the scan region $S_{20}$ is translated but rather the initial rotation center before the translation since the real rotation center is translated together with the scan region $S_{20}$.

The motor 30 and the rotary encoder 32 may be omitted. In such a case, the rotary table 26 is manually rotated by the angle $\phi$ while observing the indication mark 34 and the indexes 33, to adjust the directions of the region $S_{20}$ to the scanning directions.

The reference marks in the original holder 11 may be provided on the transparent plate 14a or 14b rather than in the windows 42a and 42b. Further, the value of the magnification factor M may be obtained through a process wherein (1) the distance between the reference marks projected on the layout sheet 18 is detected by the digitizer 17 and (2) a ratio of the detected distance to the real distance between the reference marks on the original holder 11 is calculated according to the ratio which corresponds to the magnification factor M. Therefore, a projector without a function for indicating the value of the magnification factor M may be employed, in place of the projector 15.

According to the preferred embodiment, only a desired region on the original is scanned whereby time required for scanning the image of the original can be saved. Data transmission time is also saved. Therefore, the availability of the image scanner is improved. The control unit does not require a memory which has a large storage capacity since only data corresponding to the scan region $S_{20}$ is obtained. Therefore, the memory of the control unit can store image data with respect to many originals. After an original has been set in the holder, it is not removed until image scanning is completed. Therefore, the original is not damaged. Handling of the original is easy, since the original is held in the original holder without being exposed to the exterior thereof. A skilled operator is not required for setup work. Errors in the setup process can be prevented. Further, the original holder can be economically used repeatedly for different originals.

Figure 11:
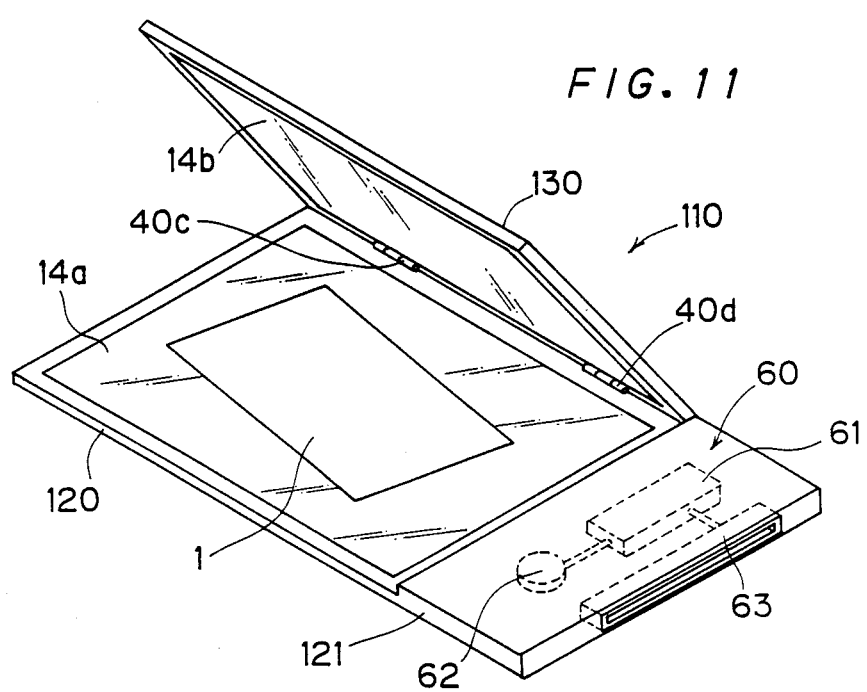
FIG. 11 is a perspective view of an original holder according to another preferred embodiment of the present invention.

FIG. 11 shows a holder 110 according to another embodiment of the present invention. The original holder 110 has frames 120 and 130 connected to each other through hinges 40c and 40d so that the frames 120 and 130 may be opened and closed around the hinges 40c and 40d. Transparent plates 14a and 14b are provided in the frames 120 and 130, respectively, similarly to the first embodiment. An original 1 is placed on the transparent plate 14a and held between the transparent plates 14a and 14b by closing the frames 14a and 14b.

A cassette 121 is integrally mounted at the side edge of the frame 120. A data storage device 60 having a memory 61, a battery 62 and a connector 63 is provided in the cassette 121. The memory 61 is a semiconductor RAM to which electric power is supplied from the battery 62. The connector 63 is electrically coupled with the memory 61 so that the memory 61 can communicate with the exterior of the original holder 110 through the connector 63. The connector 63 may be a pin connector whose connection face or connection mouth is exposed on the side edge of the cassette 121. When the memory 61 is a volatile memory such as an EEPROM, the battery 62 may be omitted.

Before setting the original holder 110 in the image scanner, the original holder 110 is carried to a preliminary data processor 51 (FIG. 12) and then to a setup apparatus 62. The preliminary data processor 51 and the setup apparatus 52 have connectors 51a and 52a, respectively, each of which fits the connector 63 in the original holder 110. After the original holder 110 is electrically connected to the preliminary data processor 51 through the coupling of the connectors 63 and 51a, data prepared in the preliminary data processor 51 is delivered from the preliminary data processor 51 to the memory 61 through the connector coupling, to be stored in the memory 61. Then, the original holder 110 is disconnected from the preliminary data processor 51, and electrically connected to the setup apparatus 52 through the coupling of the connectors 63 and 52a. Thus, data prepared in the setup apparatus 52 is transmitted to and stored in the memory 61. Data delivered from the preliminary data processor 51 and the setup apparatus 52 and stored in the memory 61 is required for scanning the image of the original 1 and separating the image data into color components. The data is generated in the processor 51 and the apparatus 52 on the basis of the image of the original 1 and a scanning plan prepared by the operator. The scan data may include the following:

(I) Original discrimination data, such as an original number, the title of an original, and the like;

(II) Trimming coordinate data representing the position of a desired scan region on the original 1 in a coordinate system defined on the original holder 110;

(III) Data representing an angle by which the rotary table 26 is to be rotated so that the edges of the scan region are parallel with the scanning directions;

(IV) Data representing the magnification factor determined according to a layout of the image on the image recording film;

(V) Coordinate data with respect to highlight and shadow points selected on the original 1; and (VI) Color separation data indicating:
  (i) the respective optical densities of the highlight and shadow points.
  (ii) the respective halftone dot area rate at the highlight and shadow points,
  (iii) the degree of sharpness enhancement,
  (iv) the gradation curve,
  (v) the respective quantities of UCR and GCR,
  (vi) the color correction character, and
  (vii) the output mode indicating a number of record images in a recording unit in which a plurality of color component images are recorded in parallel;

(VII) Halftone dot condition data indicating:
  (i) the screen ruling,
  (ii) the screen angle, and
  (iii) the shape of the halftone dot, such as a square dot, a chain dot; and (VIII) Data representing a history of data arrangement, such as:
  (i) the date and the time at which the scan data is corrected, and
  (ii) the date and the time when the original 1 is reproduced.

Figure 13:
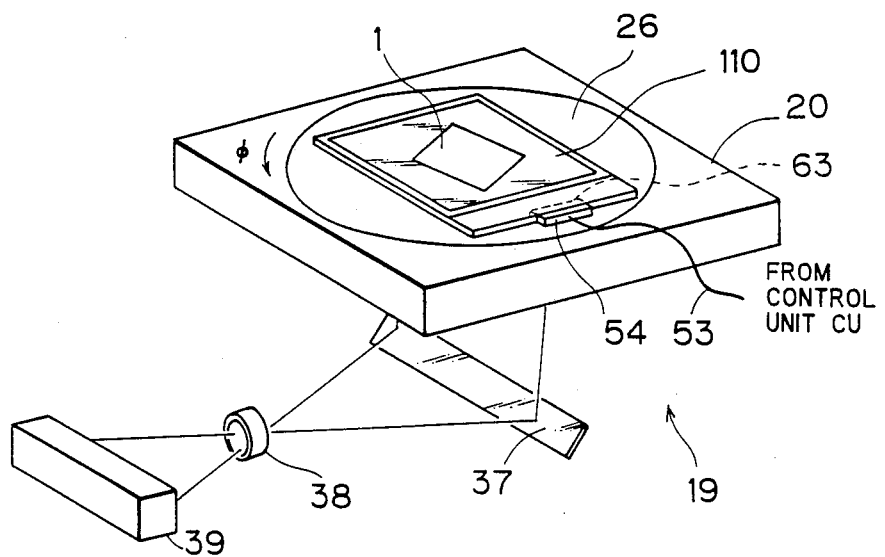
FIG. 13 is a diagram showing the state where scan data is read from a memory provided in the original holder.

After the storage operation, the original holder 110 (disconnected from the setup apparatus 52) is carried to the image scanner 19 and set on the rotary table 26, as illustrated in FIG. 13. The image scanner 19 has a signal line 53 connected to the control unit CU. A connector 54 capable of fitting the connector 63 in the original holder 110 is provided at the end of the signal line 53. After the connectors 53 and 63 are coupled to each other, the control unit CU retrieves the scan data from the memory 63 through the connectors 63 and 54 and the signal line 53 so that the scan data is automatically recorded in the control unit CU.

After disconnecting the connector 54 from the connector 63, the rotary table 26 is rotated by the angle $\phi$ as in the first embodiment, and then, the image on the scan region in the original 1 is scanned. The image data thus obtained is processed in the control unit CU and delivered to a recording unit or another image processor. The image scanning and the image data processing are conducted under the condition indicated by the scan data.

Figure 14:
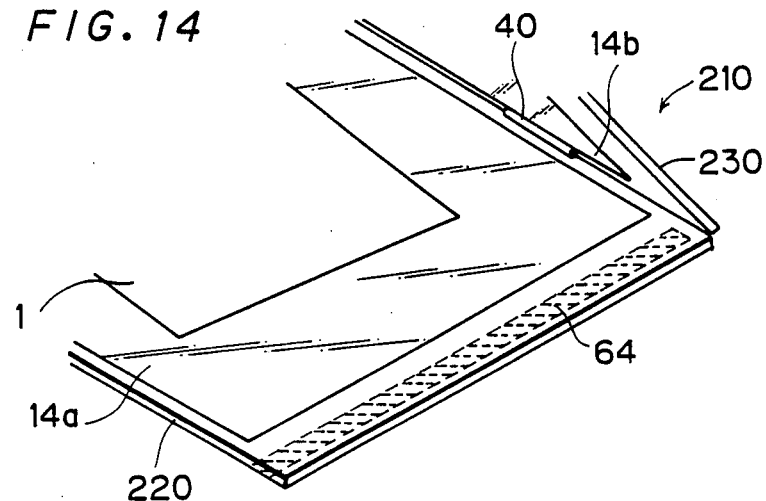
FIG. 14 is a partial view of an original holder according to another embodiment of the present invention.

FIG. 14 is a partial view of an original holder 210 according to another embodiment of the present invention. Like to the original holders 11 and 110, the original holder 210 has a pair of frames 220 and 230 connected to each other through a pair of hinges 40 (one of which is shown in FIG. 14). Transparent plates 14a and 14b are fixed in the frames 220 and 230, respectively. Magnetic tape 64 is fixed along the lower edge surface of the lower frame 220. Each of the preliminary data processor and the setup apparatus has a magnetic head for recording scan data on the magnetic tape 64 (in place of the pin connectors 51a, 51b). Preferably, the magnetic head is also operable to read data already stored in the magnetic tape 64. The original holder 210 (holding the original 1) is carried to the preliminary data processor and then to the setup apparatus. Scan data is recorded on the magnetic tape 64 through the magnetic heads of the preliminary data processor and the setup apparatus.

Figure 15:
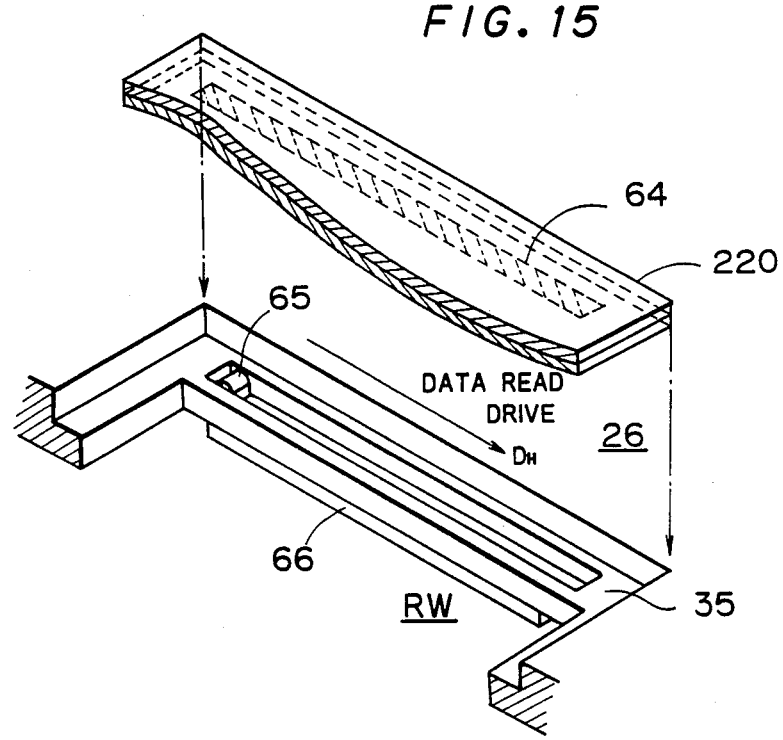
FIG. 15 is a diagram showing a magnetic head provided in the scan table.

The image scanner 19 includes a magnetic head for reading the scan data from the magnetic tape 64 (in place of the connector 53a). As illustrated in FIG. 15, the magnetic head 65 and a driving device 66 for driving the magnetic head 65 in the direction $D_H$ are provided in the step member 35 to the rotary table 26 so that the magnetic head 65 can scan the surface of the magnetic tape 64 when the original holder 210 is set in the rectangular window RW.

Data read by the magnetic head 65 is delivered to the control unit CU to be used during scanning of the original 1. Preferably, the magnetic head 65 is operable to record data on the magnetic tape 54 so that the scan data on the magnetic tape 54 can be corrected.

When a plurality of originals are held in either of the original holders 110 or 210, the original holders 110 and 210, when a plurality of originals is held in the original holder 110 or 210, the scan data with respect to each of the originals may be recorded in the memory 61 or the magnetic tape 64.

Figure 16:
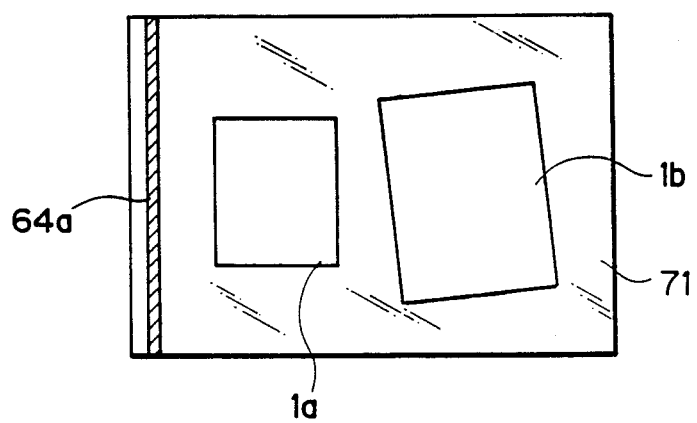
FIG. 16 and FIG. 17 are diagrams which illustrate an application of the present invention to a drum type scanner.
Figure 17:
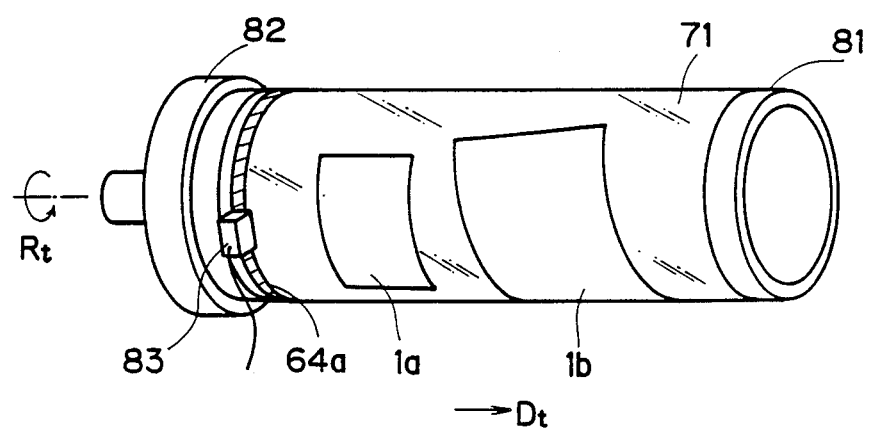

The present invention may be applied to a drum type scanner. In such a case, originals 1a and 1b (FIG. 16) are pasted on a transparent base sheet 71 provided with a magnetic tape 64a. On the magnetic tape 64a, scan data is recorded by the preliminary data processor and the setup apparatus. The magnetic tape 64a is fixed on the edge surface of the base sheet 71 along the side edge thereof. The base sheet 71 is wound on a plastic transparent drum 81, as illustrated in FIG. 17, so that the magnetic tape 64a partially or fully surrounds the drum 81 along the circular direction $R_t$. The drum 81, supported by a flange 82, is rotated in the direction $R_t$ and the scan data is read with a magnetic head 83 (which is fixed in the body of a drum type scanner), to be used for controlling image scanning and data processing. Image scanning itself is performed by rotating the drum 81 while reading the respective images of originals 1a and 1b with a pickup head (not shown) which is movable in the direction $D_t$.

When the originals 1a and 1b are set on the surface of the drum 81 without the base sheet 71, the magnetic tape 64a may be fixed on the flange 82 or at an edge of the drum 81 to partially or fully surround the same.

According to the preferred embodiments shown in FIG. 12 through FIG. 18, scan data is stored in the memory or the magnetic tape provided in the original holder so that scan data for a particular original is not mistaken for that of another original. Management of the scan data is easy since the data and the original are paired in the original holder. Further, the transmission of the original data from the preliminary data processor and the setup apparatus to the image scanner can be attained without complicated procedures or an expensive transmission apparatus.

The present invention may be applied to a monochrome process scanner as well as other image scanners employed for scanning an image of an original to read the same.

Although the present invention has been described and illustrated in detail, it is clearly understood that the same is by way of illustration and example only and is not to be taken by way of limitation. The spirit and scope of the present invention should be limited only by the terms of the appended claims.

We claim:

1. A method of placing an original in an image scanner to read an image of a desired area of said original, said method comprising the steps of:

(a) placing an original in a holder which holds said original;
    (b) observing said original while said original is held by said holder and specifying a rectangular region which includes a desired area of said original in accordance with a predetermined scanning plan;
    (c) obtaining reference data which is indicative of the location and inclination of said rectangular region with respect to said holder; and
    (d) placing said holder in an image scanner while said original is held by said holder and adjusting said holder with respect to said image scanner in accordance with said data so that a side of said rectangular region is parallel to a scanning direction of said image scanner.

2. The method of claim 1, further comprising the step of delivering said data to said image scanner and causing said image scanner to scan only said rectangular region.

3. The method of claim 1, further comprising the step of;
    projecting an image of said original on a sheet by means of an image projector; and
    wherein said steps (b) and (c) are performed with reference to said image of said original.

4. The method of claim 3, wherein:
    said holder has a reference mark;
    said step of projecting an image of said original includes projecting an image of said reference mark on said sheet;
    said step of specifying a rectangular region includes specifying a rectangular region on said sheet which includes a projected image of said desired area; and
    said step of obtaining data includes determining a positional relationship between said rectangular region on said sheet and said image of said reference mark.

5. The method of claim 4, wherein:
    said step of projecting an image of said original includes projecting images of said original and said reference mark on said sheet while magnifying said images; and
    said step of obtaining data includes transforming data representative of said positional relationship between said rectangular region on said sheet and said image of said reference mark in accordance with said magnification.

6. The method of claim 3, wherein:
    (a) said image scanner includes means for reading said image of said original to obtain image data to be delivered to an image recorder for recording an image corresponding to said image data on a recording medium;
    (b) said sheet is a layout sheet on which a location of said image of said original is indicated, said layout sheet having an edge line, said rectangular region on said sheet having a side which is parallel to said edge line of said layout sheet; and
    (c) said reference data includes:
        (1) first reference data representing coordinates of an apex of said rectangular region of said original in a coordinate system defined on said holder; and
        (2) second reference data representing said inclination with respect to said holder.

7. A system for placing an original in am image scanner to read an image of a desired area of said original, said system comprising:

(a) means for placing an original in a holder which holds said original between two transparent members;

(b) means for observing said original while said original is held by said holder and for specifying a rectangular region which includes a desired area of said original in accordance with a predetermined scanning plan;

(c) means for obtaining reference data which is indicative of the location and inclination of said rectangular region with respect to said holder; and (d) means for placing said holder in an image scanner while said original is held by said holder and for adjusting said holder with respect to said image scanner in accordance with said data so that a side of said rectangular region is parallel to a scanning direction of said image scanner.

8. A method of recording data in an image scanner, said method comprising the steps of:

(a) placing an original in a holder which holds said original between two transparent members;

(b) storing data which includes information required for scanning said original to read an image of said original;

(c) placing said holder in an image scanner while said original is held by said holder; and (d) after said step (b), reading said data by means of said image scanner to record said data in said image scanner.

9. A system for recording data in an image scanner, said system comprising:

(a) means for placing an original in a holder which holds said original between two transparent members;

(b) means for storing data which includes information required for scanning said original to read an image of said original;

(c) means for placing said holder in an image scanner while said original is held by said holder; and (d) means for reading said stored data by means of said image scanner to record said data in said image scanner.

10. A system for scanning an image of an original to read said image according to scan data indicating a scanning condition for reading said image, said system comprising:

(a) a holder for holding an original between two transparent members, said holder having a memory;

(b) data generating means for generating data in accordance with an image of said original and a scanning plan prepared by an operator, said data generating means including means for recording said data in said memory of said holder; and (c) an image scanner for scanning said image of said original, said image scanner including:
(1) a table for accepting said holder;
(2) means for scanning said image of said original to read each scanning line of said image;
(3) reading means for reading data stored in said memory; and
(4) control means for controlling said image scanner according to said generated data.

11. The system of claim 10, wherein:

said holder includes a first connector which is electrically coupled to said memory;

said data generating means includes a second connector which is capable of being connected to said first connector for delivery of said generated data to said memory through said first and second connectors; and said reading means has a third connector which is capable of being connected to said first connector to read said data stored in said memory through said first and third connectors.

12. The system of claim 10, wherein:

said memory includes magnetic tape;

said data generating means includes a first magnetic head for recording said generated data on said magnetic tape; and said reading means includes a second magnetic head for reading said recorded data.

13. A holder for holding an original in an image scanner, said holder comprising:

(A) means for holding an original; said holding means including:
(1) frame members which are connected to each other at their edges by a hinge, said frame members defining windows; and
(2) transparent plates located in said windows;

(B) a memory attached to said holding means for storing data, said memory being accessible from the exterior of said holding means.

14. A table for accepting an original thereon to read an image of said original by means of an image scanner, said table comprising:

a hollow member having a window, said window having a shape corresponding to a shape of a holder for holding said original;

a rotary table which is mounted in said window, said rotary table being rotatable with said original around a center thereof.

15. The table of claim 14, wherein:

said hollow member is a shaped as a box;

said hollow member includes a mechanism for rotating said rotary table; and said hollow member includes a detector for detecting the rotation of said rotary table with respect to a predetermined position on said hollow member.

16. The table of claim 16, wherein:

an angular index is located adjacent said window; and an indication mark is located on an edge of said rotary table so that the rotation of said rotary table can be determined by observing said angular index and said indication mark.

17. A method of recording data in a drum-type image scanner, said method comprising the steps of:

positioning an original on a transparent base sheet;

recording data on tape located at an edge of said base sheet, said data including positional information required for scanning an image of said original with a drum-type image scanner;

winding said transparent base sheet having the original already positioned thereon onto a drum in such a manner that said tape partially or fully surrounds said drum; and rotating said drum around an axis while reading said data from said tape to record said data in said drum-type image scanner.

18. The method of claim 17, wherein said tape is magnetic tape.

19. A system for recording data in a drum-type image scanner, said system comprising:

means for positioning an original on a base sheet;

means for recording data on tape located at an edge of said base sheet, said data including information required for scanning an image of said original with a drum-type image scanner;

means for winding said base sheet on a drum with said tape partially or fully surrounding said drum; and means for rotating said drum around an axis while reading said data from said tape to record said data in said drum-type image scanner.

20. A drum for use in a drum-type image scanner for reading an image of an original, said drum comprising:
   a surface around which an original can be wound; and
   a memory circumferentially located on said surface for storing data.

21. The drum of claim 20, wherein said memory includes magnetic tape which is wound on said surface.

22. A base sheet for holding an original while said base sheet is wound on a drum of a drum-type image scanner, said base sheet comprising:
   a transparent portion on which said original is positioned; and
   a memory physically attached to said transparent portion for storing data.

23. The method of claim 1, wherein said holder includes two transparent members, said step of placing said original in said holder including placing said original between said two transparent plates of said holder.

* * * * *